(12) United States Patent
Nelson et al.

(10) Patent No.: US 7,667,827 B2
(45) Date of Patent: Feb. 23, 2010

(54) SYSTEMS AND METHODS FOR REMOTE MONITORING OF VIBRATIONS IN MACHINES

(75) Inventors: Matthew Allen Nelson, Gardnerville, NV (US); Naresh Sundaram Iyer, Clifton Park, NY (US); John Erik Hershey, Ballston Lake, NY (US); Charles Erklin Seeley, Niskayuna, NY (US); Piero Patrone Bonissone, Schenectady, NY (US); Kai Frank Goebel, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 451 days.

(21) Appl. No.: 11/307,334

(22) Filed: Feb. 1, 2006

(65) Prior Publication Data
US 2007/0175283 A1 Aug. 2, 2007

(51) Int. Cl.
*G01H 17/00* (2006.01)
*F02P 17/00* (2006.01)
(52) U.S. Cl. .................... 356/32; 356/426; 356/445; 73/1.82
(58) Field of Classification Search ................ 356/32; 73/1.82
See application file for complete search history.

(56) References Cited

U.S. PATENT DOCUMENTS

| | | | | |
|---|---|---|---|---|
| 2,853,954 | A | * | 9/1958 | Lowry .................... 104/87 |
| 3,462,223 | A | * | 8/1969 | Engeler et al. ............ 356/32 |
| 3,879,988 | A | * | 4/1975 | Jacobs .................... 73/657 |
| 5,610,327 | A | * | 3/1997 | Becker et al. .......... 73/114.65 |
| 6,293,151 | B1 | | 9/2001 | Kawamata et al. |
| 6,512,584 | B1 | * | 1/2003 | O'Loughlin et al. ....... 356/388 |
| 7,152,456 | B2 | * | 12/2006 | Eaton .................... 73/1.79 |
| 2005/0060323 | A1 | * | 3/2005 | Leung et al. ............. 707/100 |
| 2006/0028656 | A1 | * | 2/2006 | Venkatesh et al. .......... 356/620 |
| 2006/0260407 | A1 | * | 11/2006 | Donskoy et al. ............ 73/657 |
| 2007/0177129 | A1 | * | 8/2007 | Kothari et al. ............ 356/32 |

FOREIGN PATENT DOCUMENTS

JP 05-322642 * 7/1993

* cited by examiner

*Primary Examiner*—Gregory J Toatley, Jr.
*Assistant Examiner*—Rebecca C Slomski
(74) *Attorney, Agent, or Firm*—Sutherland Asbill & Brennan LLP

(57) ABSTRACT

A system and method for monitoring the vibrations of a machine that includes a reflective patch affixed to the machine and a vibration detection unit including an optics module. The optics module may be positioned remotely from the machine such that the optics module transmits an electromagnetic beam to the reflective patch and reflected from the reflective patch to the optics module. The optics module demodulates the electromagnetic beam to determine the vibration of the machine.

15 Claims, 5 Drawing Sheets

SYSTEMS AND METHODS FOR REMOTE MONITORING OF VIBRATIONS IN MACHINES

TECHNICAL FIELD

This invention relates to systems and methods for monitoring vibrations in machines and more particularly relates to the remote monitoring of vibrational information using electromagnetic interrogator beams.

BACKGROUND OF THE INVENTION

Factories, warehouses, and other facilities typically employ various types of machines for the manufacture or distribution of products. Because such machinery generally includes parts in motion, vibrations are generated from an individual machine and transmitted to the machine housing. Excessive vibration or vibrational modes of a particular character may indicate an unhealthy machine that may be in need of repair. Thus, it is common to monitor the vibration of a machine to prevent possible damage.

In order to determine the magnitude and nature of the vibration, transducers may be attached to, or placed in contact with, the machine housing so as to monitor the vibration. Subsequent analysis of the vibrational information determined by the transducers may provide valuable diagnostic data relating to the health of the monitored machinery. However, to monitor all machines, a transducer must be attached at every location in which monitoring of the vibration is desired. The health of the individual transducer also must be further monitored to ensure that the transducer is properly operating. In a facility employing thousands of machines, the purchase, installation, maintenance, and repair of thousands of transducers can become excessively expensive.

Alternatively, portable data collectors (PDC's) may be used to monitor the health of the monitored machinery. The PDC's are mobile devices that include a transducer and recording means to monitor the health of the machines. The PDC is transported to a machine and the transducer is placed in contact with the housing of the machine. The PDC can then record the vibrations of the housing. These recordings are subsequently analyzed in an attempt to assess the health of the machine. Operators must personally visit each machine and operate the PDC to record the vibrational information. The PDC operator may, therefore, spend an exorbitant amount of time monitoring the machines.

These current methods of monitoring the health of machines generally are expensive and time consuming. Often, a machine is in good health and does not require an extensive diagnostic check up. On the contrary, a failing machine may require more frequent data analyses. Thus, significant resources may be wasted. Therefore, there is a need in the art for a system and method for efficient remote monitoring of the vibrational health of a machine.

SUMMARY OF INVENTION

According to one embodiment of the invention, a system for monitoring the vibration of a machine may include a reflective patch affixed to the machine and a vibration detection unit. The vibration detection unit includes an optics module, wherein the optics module transmits an interrogator beam to a reflective patch and the reflective patch reflects a vibration modulated beam to the vibration detection unit. The optics module of the vibration detection unit may then demodulate the interrogator beam to determine the vibration of the machine. In one embodiment of the invention, the interrogator beam is a laser beam. In another aspect of the invention the reflective patch is retro reflective tape.

Another aspect of the invention includes a beam reflector operable for receiving the interrogator beam from the optics module and reflecting the interrogator beam to the reflective patch and operable for receiving the vibration modulated beam reflected from the reflective patch and reflecting the vibration modulated beam to the vibration detection unit. The optics module also may be oriented by a control module so that the interrogator beam can be directed at the reflective patch affixed to the machine or to a plurality of machines. The optics module also may be oriented to transmit the interrogator beam to at least one of the plurality of machines remotely. The optics module may further be rotatable in at least one angle. According to yet another aspect of the invention, the optics module may include a processor for demodulating the vibration modulated beam.

According to another embodiment of the invention, a method for monitoring the vibration of at least one machine may include affixing at least one reflective patch to at least one machine, positioning a vibration detection unit, comprising an optics module, remotely from the at least one machine, transmitting an interrogator beam from the optics module to the at least one reflective patch affixed to the at least one machine, reflecting a vibration modulated beam from the at least one reflective patch to the optics module, and demodulating the vibration modulated beam to determine the vibration of the at least one machine. In another aspect of the invention, the method may include providing a beam reflector operable for receiving the interrogator beam from the optics module, reflecting the interrogator beam from the beam reflector to the reflective patch, receiving the interrogator beam reflected from the reflective patch, and reflecting the vibration modulated beam to the optics module.

According to another embodiment of the invention, a method for analyzing a plurality of machines from at least one facility. In this embodiment, the method includes affixing at least one reflective patch to the plurality of machines in the at least one facility, positioning a vibration detection unit comprising an optics module remotely from the plurality of machines in the at least one facility, transmitting an interrogator beam from the optics module to the at least one reflective patch affixed to the plurality of machines in the at least one facility, reflecting a vibration modulated beam from the at least one reflective patch to the optics module in the at least one facility, demodulating the vibration modulated beam to determine the vibrational data of the at least one machine, transmitting the vibrational data of the at least one machine to a remote analysis facility, and determining statistical information from the vibrational data of the at least one machine from the plurality of facilities. In one aspect of the invention, the statistical information is determined for a particular model of machine. In another aspect, the statistical information is determined for a particular manufacturer of machine. In yet another embodiment, the statistical information is determined for a plurality of machines from one facility.

BRIEF DESCRIPTION OF THE DRAWINGS

Figure 1A:
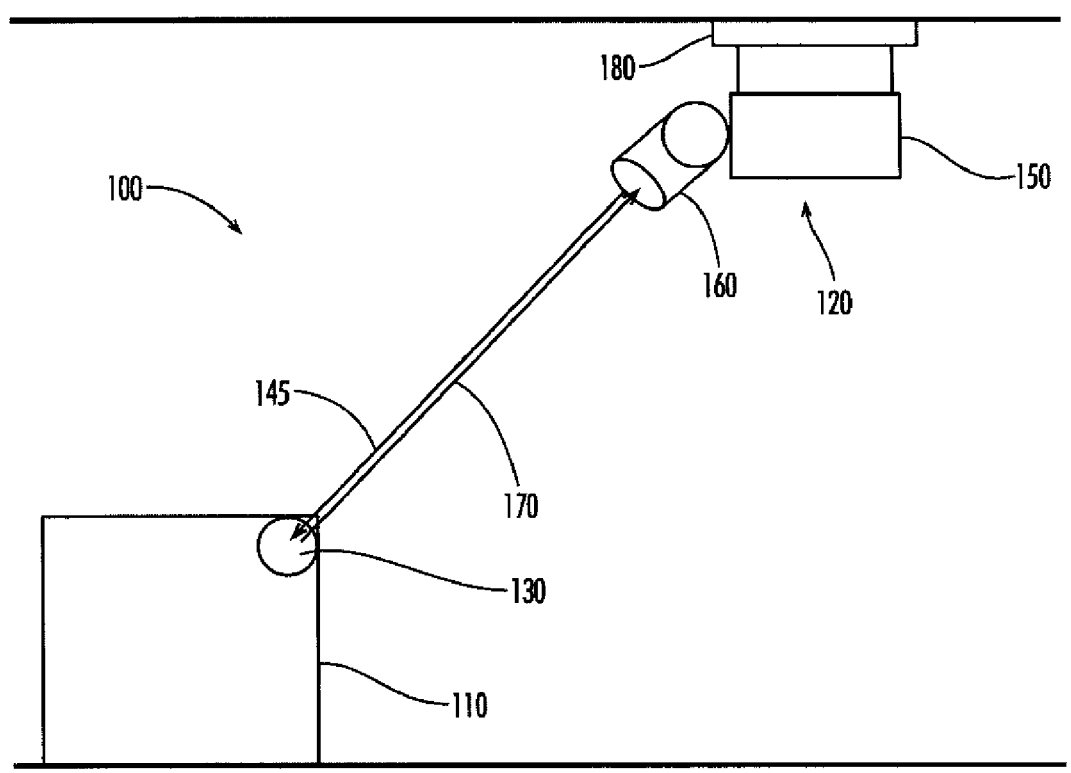

Having thus described the invention in general terms, reference will now be made to the accompanying drawings, which are not necessarily drawn to scale, and wherein:

FIG. 1a illustrates the system of remote monitoring of vibration information from a machine according to an aspect of this invention.

Figure 1B:
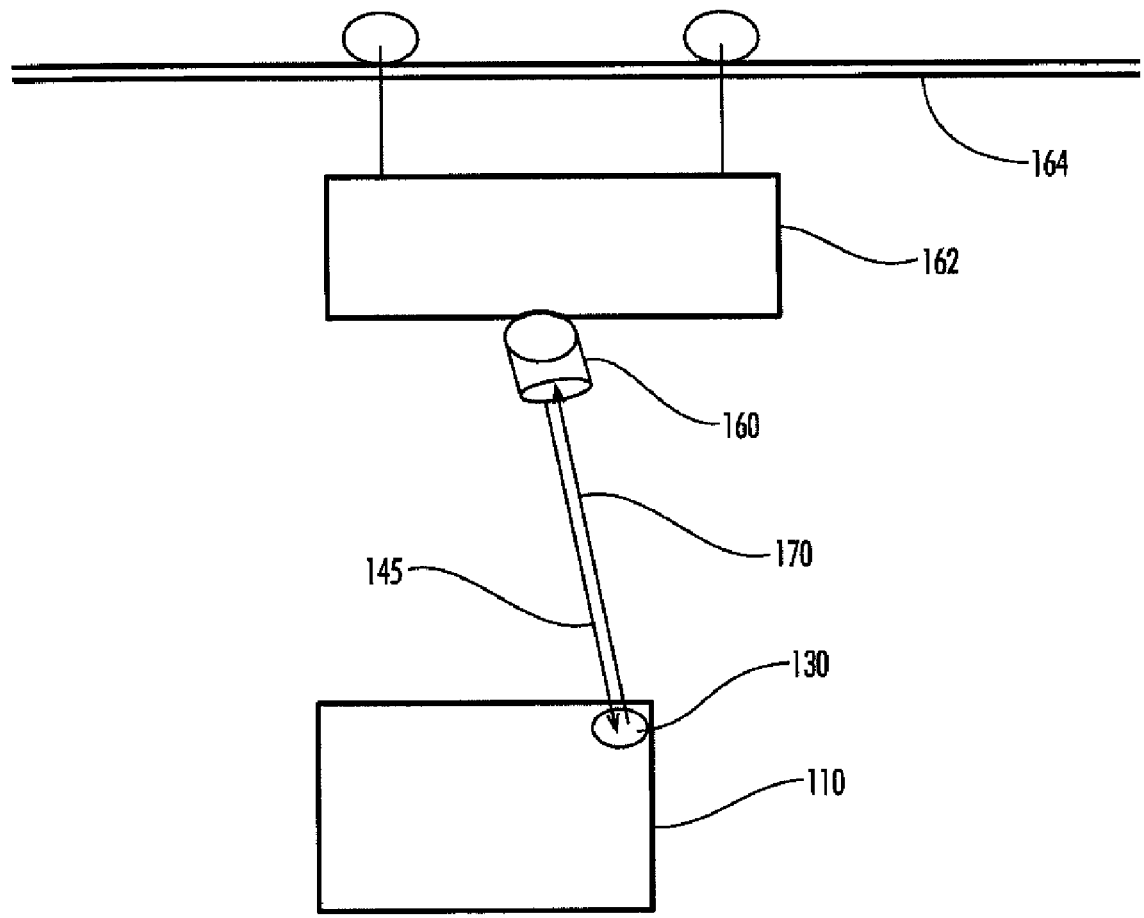

FIG. 1b illustrates the system of remote monitoring of vibration information from a machine with an optics module affixed to a movable system on the ceiling according to an aspect of this invention.

Figure 1C:
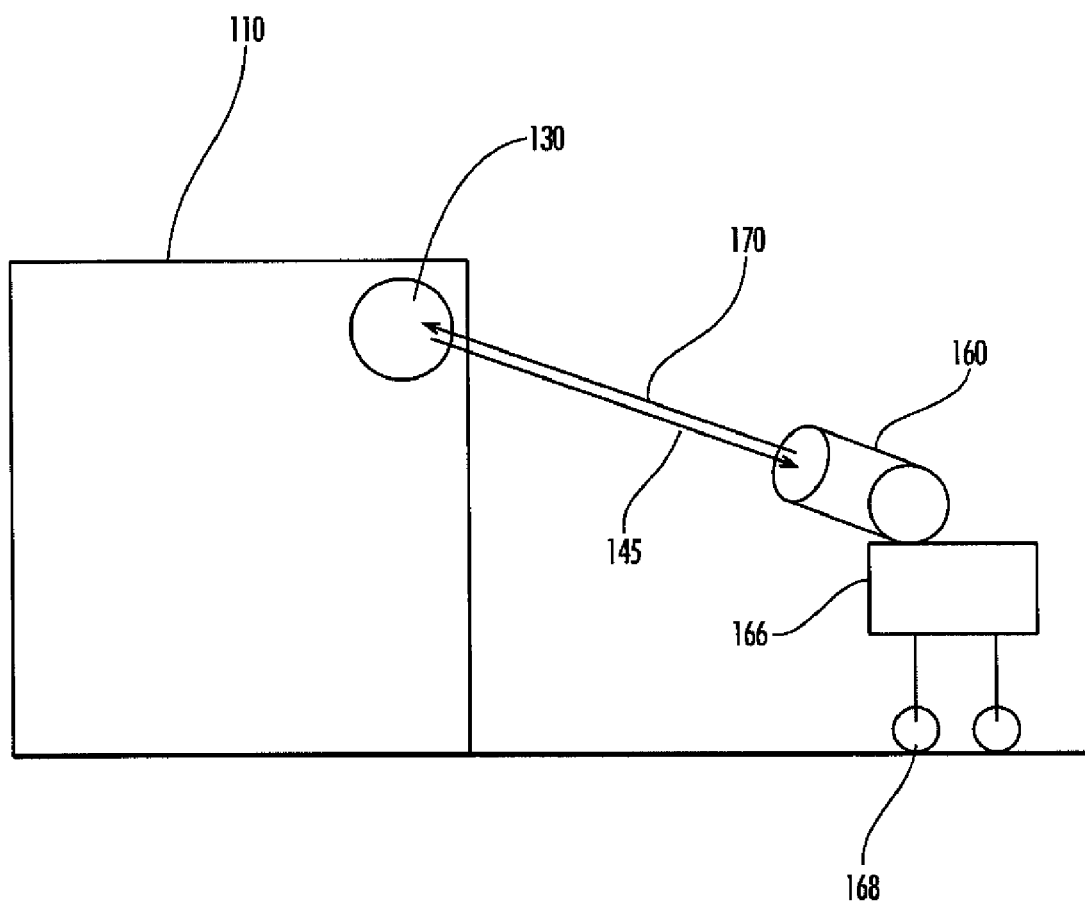

FIG. 1c illustrates the system of remote monitoring of vibration information from a machine with an optics module affixed to a movable system on the floor according to an aspect of this invention.

Figure 2:
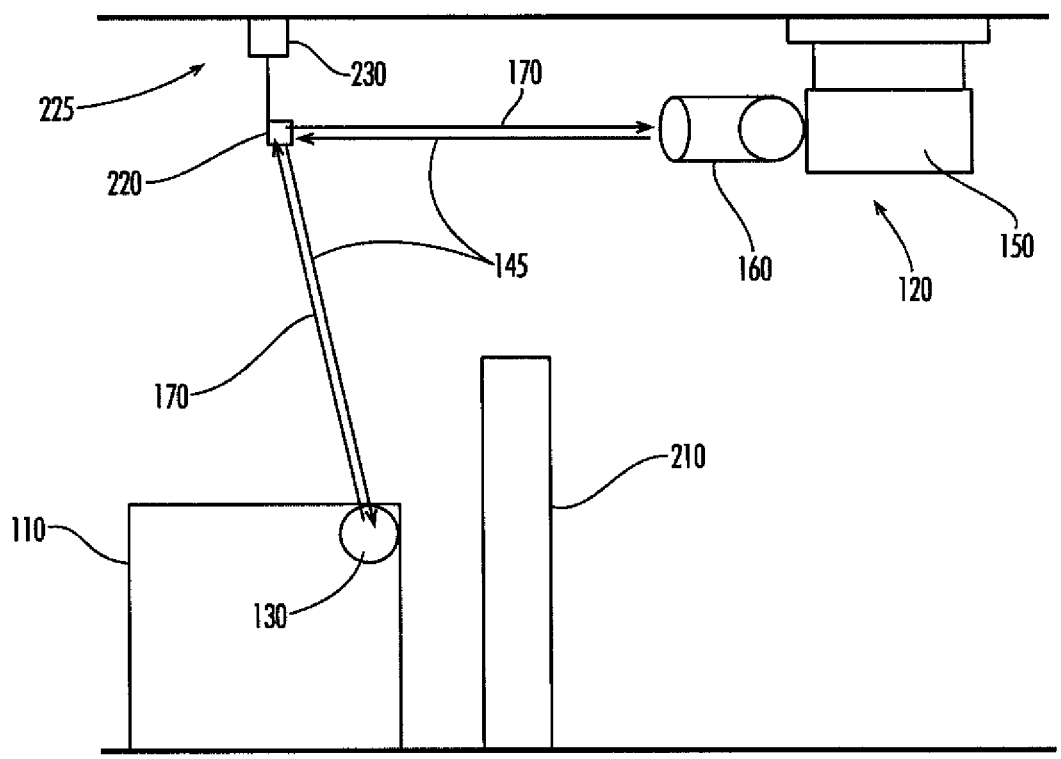

FIG. 2 illustrates the re-routing of an interrogator beam around an obstacle according to an aspect of this invention.

Figure 3:
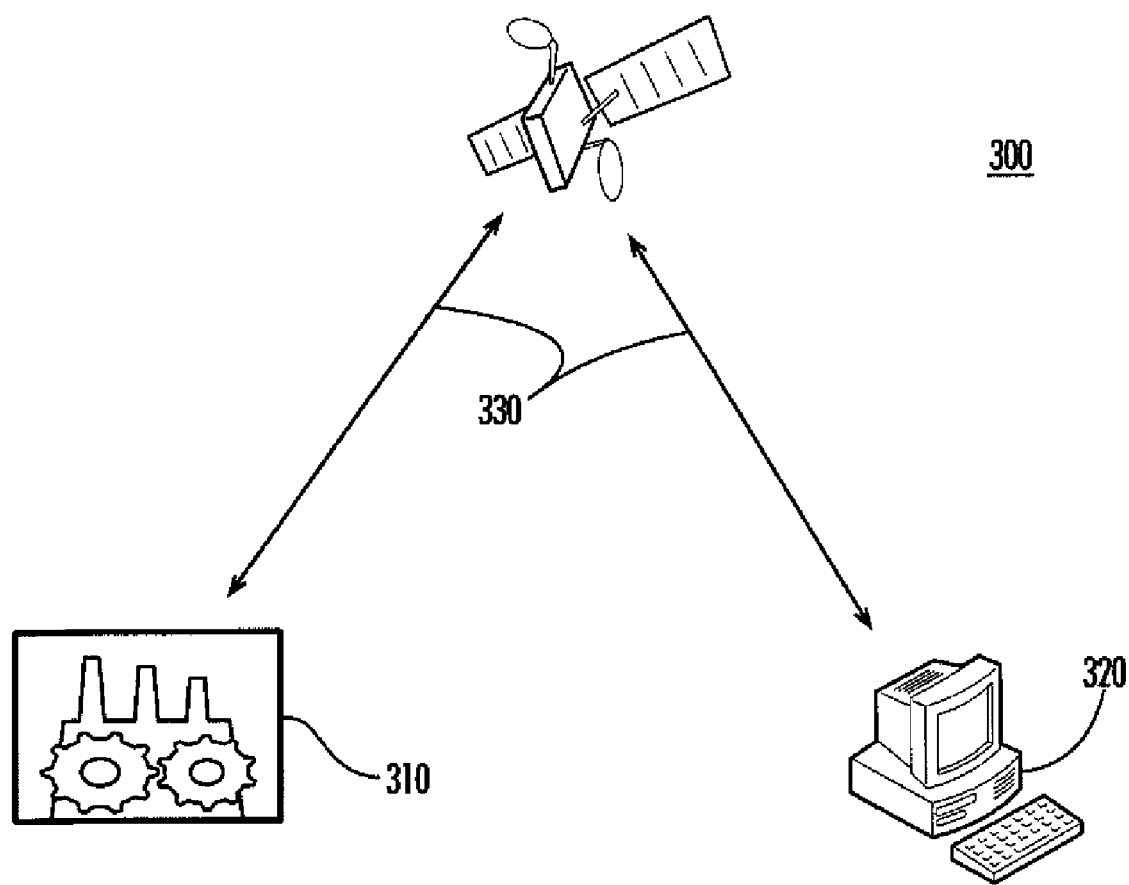

FIG. 3 illustrates a communication relationship between the vibration detection unit and a remote service facility according to an aspect of this invention.

DETAILED DESCRIPTION OF INVENTION

The present invention now will be described more fully hereinafter with reference to the accompanying drawings, in which exemplary embodiments of the invention are shown. This invention may, however, be embodied in many different forms and should not be construed as being limited to the embodiments set forth herein; rather, these embodiments are provided so that this disclosure will be thorough and complete, and will convey the scope of the invention to those skilled in the art.

FIG. 1a illustrates a remote monitoring system 100 for the remote monitoring of the vibrations of a machine 110. The embodiment of FIG. 1a may be included in a factory, warehouse, or any other facility that requires the use of machinery. The remote monitoring system 100 may include a vibration detection unit 120 and a reflective patch 130. The vibration detection unit 120 may include a control module 150 and an optics module 160 that emits an interrogator beam 145. The control module may include a general purpose computer, special purpose computer, microprocessor, other programmable data processing apparatus, or a computer-readable memory that can direct a computer or other programmable data processing apparatus to function in accordance with this invention.

The interrogator beam 145 may be an electromagnetic beam. The electromagnetic beam may be a laser beam or any other suitable energy beam that can be used to detect vibrations of a machine. In an exemplary embodiment, the optics module 160 is a vibrometer manufactured by Polytec, Inc. of Tustin, Calif. One of ordinary skill in the art will appreciate that the optics module 160 may be any device or system of devices operable for the transmission and reception of an interrogator beam.

The vibration detection unit 120 may be located in any location in which it is operable to monitor the vibration of a machine. In an exemplary embodiment, the vibration detection unit 120 is attached to a structural frame of a facility ceiling. In another embodiment, the vibration detection unit 120 may be mounted on a movable system positioned to allow the optics module 160 to emit the electromagnetic beam to a desired location. FIGS. 1b and 1c illustrate exemplary embodiments of the optics module 160 affixed to a movable system to allow the optics module 160 to interrogate machines positioned at various locations in a facility. As shown in FIG. 1b, the optics module 160 may be affixed to a train 162 located about the ceiling of the facility. The train 162 may interface a track 164 at or near the ceiling of the facility. The train 162 may move in relation to the track 164 so that the train may be positioned with respect to any desired machine or sets of machines. The train 162 may be moved about the track either manually or electronically guided. As shown in FIG. 1c, the optics module 160 may be affixed to a mobile cart 166 that may move about the floor of the facility. The mobile cart 166 may interface the floor directly or may interface a track (not shown). In the exemplary embodiment of FIG. 1c, the mobile cart 166 includes casters 168 to allow the mobile cart 166 to roll about the floor. The mobile cart 166 may be moved either manually or electronically guided.

The optics module 160 may be oriented about one or more rotational and/or translational degrees of freedom. One of ordinary skill in the art will appreciate that any number of angular degrees of freedom are contemplated herein. The optics module 160 may be adjustable to control characteristics of the emitted interrogator beam 145, including but not limited to adjustment of the focal length, power, and multiplicity of beams. The adjustments may be performed electro-mechanically under the control of a software program or manually by an operator. The control module 150 controls the beam pointing direction of the optics module 160 and other adjustments to the optics module 160 such as the focal length of the emitted interrogator beam 145. The control module 150 may also receive external commands respecting the operation of the optics module 160 and the control module 150 may also report out the demodulated vibration data to an external or remote analysis facility. The optics module may be rotated to direct the interrogator beam at a reflective target on a substantially stationary surface to perform a diagnostic check for vibration of the optics module.

The reflective patch 130 of the remote monitoring system 100 may be affixed to the machine 110. The reflective patch 130 may be affixed at any location on the machine 110. A plurality of reflective patches also may be affixed to the machine in a number of locations on the machine for use in monitoring vibrations of different components or locations of the machine.

The reflective patch 130 may be a retro reflective patch that receives the interrogator beam at a normal or non-normal angle of incidence and reflects the interrogator beam 145 along the same or similar angle of incidence. In an exemplary embodiment, the reflective patch 130 is operable to reflect an interrogator beam 145 that is tens of degrees off-axis to a vector normal to the reflective patch 130 surface. In an exemplary embodiment, the reflective patch 130 is a retro reflective tape. The retro reflective tape may be easily affixed to a machine and allows a beam to be reflected at the same or similar angle of incidence as the incoming beam. The retro reflective tape of the exemplary embodiment may be commercially available tape, including but not limited to reflective tape sold by Reflexite Americas of New Britian, Conn., or tape designed and manufactured specifically for use in this invention. In another embodiment, the reflective patch 130 includes at least one corner cube reflector. One of ordinary skill in the art will appreciate that any reflective patch may be employed to reflect a beam along the same or similar angle of incidence of the transmitted beam, including but not limited to a mirror or other types of retro reflective tape.

The optics module 160 may transmit the interrogator beam 145 towards the reflective patch 130 affixed to the machine 110. The interrogator beam 145 travels to the reflective patch 130 affixed to the housing of the monitored machine 110. The reflective patch 130 receives the interrogator beam 145 and reflects the interrogator beam as a vibration modulated beam 170. The vibration modulated beam 170 returns to the optics module 160 along the same or similar path as the interrogator beam 145. Due to the vibration of the machine and in turn the vibration of the reflective patch affixed thereto, the vibration modulated beam 170 will carry the vibration information of the machine 110.

In order to determine the vibration of the machine, the vibration modulated beam 170 is demodulated in the optics module 160 and the machine vibrational data is recovered. The optics module 160 may also include an optical filter to filter out ambient radiation that is outside of the very narrow-band spectral range of the vibration modulated beam 170. Demodulation of the vibration modulated beam is well-understood by persons skilled in the art and a person of ordinary skill in the art will appreciate that any appropriate method or system may be employed to demodulate the vibration modulated beam to determine the vibrational information contained therein, including Doppler shift demodulation.

The vibration detection unit 120 may further include a vibration isolation unit 180 that mitigates structural borne vibrations from interfering with the vibrational data embedded in the vibration modulated beam 170. The vibration isolation unit 180 may be installed between the vibration detection unit 120 and its host structure. Vibration isolation units are well known in the art and are commercially available. They are based on one or a combination of multiple technologies including, but not limited to, spring and beam column isolators, air bladders, and viscoelastic damping materials.

The components of the vibration detection unit may be integrated into one system or may include separate components. In an exemplary embodiment, the optics module 160 and the control module 150 are separate components that are mounted together in a facility. In another embodiment, the optics module 160 and the control module 150 are an integrated system. In yet another embodiment, the components of the vibration detection unit reside in different locations. For example, the optics module 160 may be located in a room containing the machine to be monitored and the control module 150 may be located in a separate room or completely separate location than the facility.

As illustrated in the embodiment of FIG. 2, the vibration detection unit 120 may be used to monitor the vibration of each of a plurality of machines 110. A reflective patch 130 may be affixed to the number of machines to be monitored. The angular and/or translational pointing position of the optics module 160 may be controlled through a software control system resident in the control module 150 or manually controlled through electromechanical controls. The optics module 160 may be rotated about a number of angles to align the interrogator beam with the reflective patch of a monitored machine. In another embodiment, the optics module 160 may further be mounted on at least one track (not shown) to allow the optics module 160 to translate linearly with respect to the number of machines to optimize the incidence angle of the interrogator beam 145 onto the reflective patch 130 of the monitored machine. One of ordinary skill in the art will appreciate that any means for positioning the optics module 160 such that it can transmit an interrogator beam 145 to the reflective patch 130 is contemplated herein.

In a factory or other location, the path between the optics module 160 and the reflective patch 130 affixed on a machine may be obstructed. FIG. 2 illustrates a situation in which an obstruction 210 blocks the interrogator beam 145 from being transmitted in a straight line from the optics module 160 to the reflective patch 130. A beam reflector 220 may be used to reflect the interrogator beam around the obstruction. The beam reflector 220 may be aligned so that the interrogator beam 145 is redirected from the optics module 160 to the reflective patch 130. The beam reflector 220 may be affixed in any location proximate to the reflective patch 130 and the optics module 160. In an exemplary embodiment, the beam reflector 220 is attached to a structural frame such as a factory ceiling using an attachment unit 225. The attachment unit 225 may include a beam reflector vibration isolation unit 230. The beam reflector 220 also may include a remotely controlled rotator unit to change the angles of incidence and reflection of the interrogator beam 145 in order to monitor a number of machines. One of ordinary skill in the art will appreciate that any system that allows the interrogator beam to be re-directed around an obstruction to the reflective patch 130 is contemplated herein.

FIG. 3 illustrates a two-way communications link 330 between a facility 310 housing the plurality of monitored machines and a remote analysis facility 320. The remote analysis facility 320 may be used to analyze the vibration data to determine strategies for resolving the vibrational concerns related to the machines. The communications link 330 may be satellite-based, fiber-optic, land-based, radio, wire-line, the Internet, or any other data transport facility. The remote analysis facility 320 may include any processor-driven device, such as a personal computer, laptop computer, hand-held computer and the like which may further include a memory, input/output ("I/O") interface(s) and a network interface. The memory may store data files and various computer executable programs, such as an operating system ("OS") and a data analysis program.

The remote analysis facility 320 may analyze the vibrational data from one or a number of machines from at least one facility using the data analysis program. The data analysis program may include a statistical analysis of the vibrational data. In one embodiment, the remote analysis facility may determine statistical information relating to a particular model or manufacturer of machines in a number of facilities. In another embodiment, the remote analysis facility may determine statistical information on all machines in one particular facility. One of ordinary skill in the art will appreciate that this invention is not limited to the aforementioned statistical analyses but may be any statistical analysis relating to the plurality of machines.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in generic and descriptive sense only and not for purposes of limitation.

What is claimed is:

1. A system for monitoring the vibration of a plurality of machines located in a common facility, comprising:
    a plurality of retro-reflective patches, wherein one or more of the plurality of machines comprises one or more of the retro-reflective patches affixed thereon; and
    a vibration detection unit comprising:
        an optics module positioned in the facility, wherein the optics module is operable to determine the vibration of a selected one of the plurality of machines by transmitting an interrogator beam to a selected one of the plurality of retro-reflective patches affixed to the selected one of the plurality of machines, receiving a vibration modulated beam from the selected one of the plurality of retro-reflective patches, and demodulating the vibration modulated beam; and
        a control module operable to orient the optics module so that the optics module separately determines the vibration of some or all the plurality of machines in the facility, wherein the control module orients the optics module via rotation, translation, or a combination thereof.

2. The system of claim 1, wherein the interrogator beam comprises a laser beam.

3. The system of claim 1, wherein the retro-reflective patch comprises a retro reflective tape.

4. The system of claim 1, further comprising a beam reflector that receives the interrogator beam from the optics module, reflects the interrogator beam to the retro-reflective patch, receives the vibration modulated beam reflected from the retro-reflective patch, and reflects the vibration modulated beam to the optics module.

5. The system of claim 1, wherein the optics module comprises a processor for demodulating the vibration modulated beam.

6. The system of claim 1, wherein the optics module is affixed to a train that is movable about a track system affixed to a ceiling of the facility.

7. The system of claim 1, wherein the optics module is affixed to a mounting cart that is movable about a floor of the facility.

8. A method for monitoring the vibration of a plurality of machines, comprising:
affixing a retro-reflective path to each machine;
positioning a vibration detection unit, comprising an optics module, remotely from each machine;
separately determining the vibration of each machine, the vibration of any one machine being determined by:
orienting, via rotation, translation, or a combination thereof, the optics module to transmit an interrogator beam to and receive a vibration modulated beam from the retro-reflective patch affixed to the one machine;
transmitting the interrogator beam from the optics module to the retro-reflective patch affixed to the one machine;
receiving the vibration modulated beam reflected from the retro-reflective patch to the optics module; and
demodulating the vibration modulated beam to determine the vibration of the one machine.

9. The method of claim 8, further comprising:
receiving the interrogator beam from the optics module using a beam reflector;
reflecting the interrogator beam from the beam reflector to the retro-reflective patch;
receiving the interrogator beam reflected from the retro-reflective patch; and
reflecting the vibration modulated beam to the optics module.

10. The method of claim 9, further comprising:
providing a control module operable to orient the optics module; and
orienting the optics module to transmit the interrogator beam to the one machine whose vibration is being determined.

11. The method of claim 8, further comprising:
analyzing the vibration of at least two machines to determine statistical information about the vibrations.

12. The method of claim 11, wherein the statistical information is determined for a particular model of machine, the at least two machines being the same model of machine.

13. The method of claim 11, wherein the statistical information is determined for a particular manufacturer of machine, the at least two machines being manufactured by the same manufacturer.

14. The method of claim 11, wherein the at least two machines are located in at least two facilities.

15. The method of claim 8, wherein separately determining the vibration of each machine further comprises:
adjusting an orientation of the optics module to transmit a first interrogator beam to the retro-reflective patch of a first machine
readjusting the orientation of the optics module to transmit a second interrogator beam to the retro-reflective patch of a second machine.

* * * * *